United States Patent
Korobov et al.

(10) Patent No.: US 11,704,149 B1
(45) Date of Patent: *Jul. 18, 2023

(54) METHODS AND SYSTEMS FOR SEAMLESS VIRTUAL MACHINE CHANGING FOR SOFTWARE APPLICATIONS

(71) Applicant: PARALLELS INTERNATIONAL GMBH, Schaffhausen (CH)

(72) Inventors: Ivan Korobov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,579

(22) Filed: Apr. 11, 2022

Related U.S. Application Data

(63) Continuation of application No. 16/777,428, filed on Jan. 30, 2020, now Pat. No. 11,301,285.

(51) Int. Cl.
　　*G06F 9/455* (2018.01)
　　*G06F 11/34* (2006.01)
　　*G06F 9/50* (2006.01)

(52) U.S. Cl.
　　CPC .......... *G06F 9/45558* (2013.01); *G06F 9/505* (2013.01); *G06F 11/3442* (2013.01); *G06F 11/3452* (2013.01); *G06F 2009/4557* (2013.01); *G06F 2009/45562* (2013.01); *G06F 2009/45575* (2013.01); *G06F 2009/45579* (2013.01); *G06F 2009/45583* (2013.01)

(58) Field of Classification Search
　　CPC .. G06F 9/45558; G06F 9/505; G06F 11/3442; G06F 2009/45562; G06F 2009/4557; G06F 2009/45575; G06F 2009/45579; G06F 2009/45583
　　See application file for complete search history.

(56) References Cited

U.S. PATENT DOCUMENTS

| | | | |
|---|---|---|---|
| 10,191,778 B1* | 1/2019 | Yang | G06F 11/301 |
| 2010/0192143 A1* | 7/2010 | Ingle | H04L 67/06 717/172 |
| 2010/0235831 A1* | 9/2010 | Dittmer | G06F 9/45558 718/1 |
| 2010/0299667 A1* | 11/2010 | Ahmad | G06F 16/273 718/1 |
| 2012/0233668 A1* | 9/2012 | Leafe | G06F 9/44526 726/4 |

(Continued)

*Primary Examiner* — Dong U Kim
(74) *Attorney, Agent, or Firm* — Rosenberg, Klein & Lee

(57) ABSTRACT

A method and a system to perform the method are disclosed, the method includes receiving, by a virtualization server communicatively coupled with a client device, a request to provide a virtual machine (VM) to a client device, accessing a profile associated with the client device, instantiating a VM on the virtualization server, wherein the VM is a linked clone VM of a base VM, wherein the linked clone VM has (1) a read-only access to a shared range of a persistent memory associated with the base VM, wherein the shared range of the persistent memory is determined in view of the profile associated with the client device and stores at least one application installed on the virtualization server, (2) a write access to a private range of the persistent memory, wherein the private range is associated with the VM, and providing the VM to the client device.

14 Claims, 4 Drawing Sheets

(56) References Cited

U.S. PATENT DOCUMENTS

| | | | |
|---|---|---|---|
| 2013/0080641 A1* | 3/2013 | Lui | H04L 41/046 709/226 |
| 2014/0149347 A1* | 5/2014 | Ben-Shaul | G06F 9/451 707/623 |
| 2014/0258533 A1* | 9/2014 | Antony | H04L 67/133 709/226 |
| 2015/0058837 A1* | 2/2015 | Govindankutty | G06F 8/63 718/1 |
| 2015/0178109 A1* | 6/2015 | Li | G06F 9/45558 718/1 |
| 2015/0199343 A1* | 7/2015 | Dabak | G06F 9/455 713/189 |
| 2015/0378766 A1* | 12/2015 | Beveridge | G06F 9/45558 718/1 |
| 2016/0170788 A1* | 6/2016 | Tarasuk-Levin | G06F 3/065 718/1 |
| 2017/0123838 A1* | 5/2017 | Bavishi | G06F 9/52 |
| 2019/0102157 A1* | 4/2019 | Caldato | G06F 9/505 |

\* cited by examiner

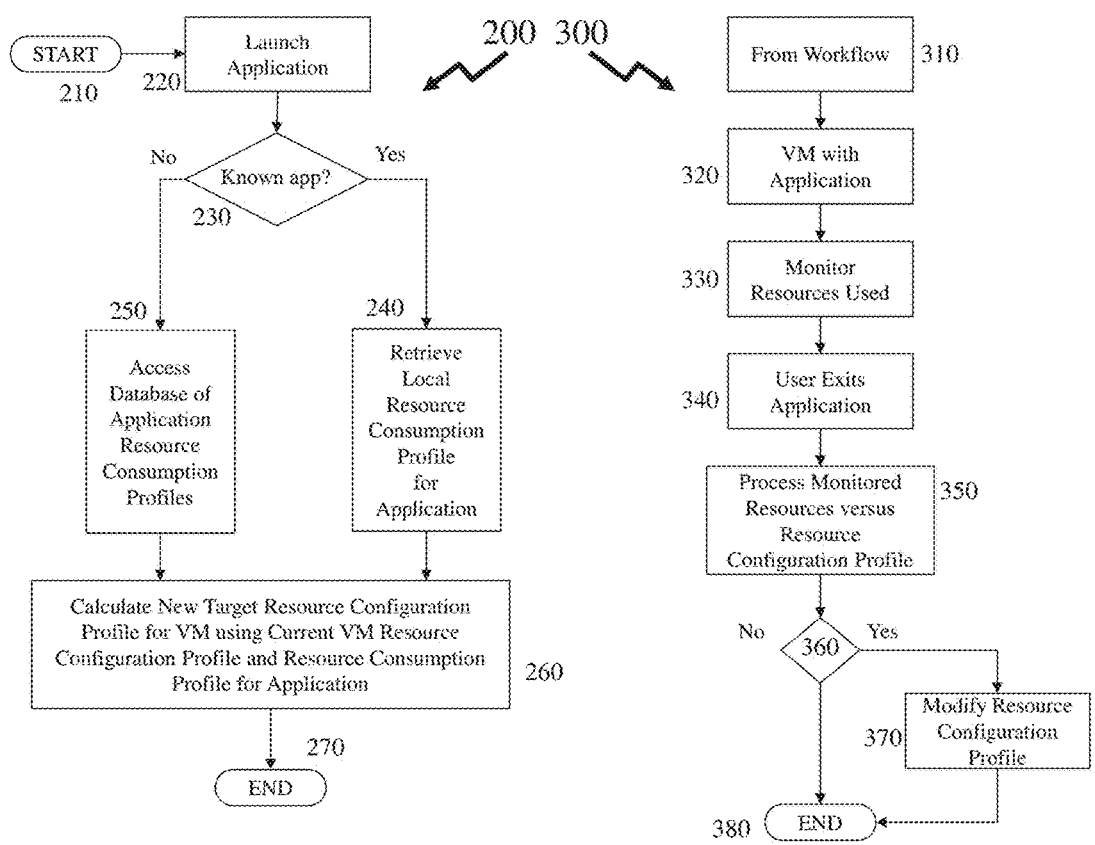

METHODS AND SYSTEMS FOR SEAMLESS VIRTUAL MACHINE CHANGING FOR SOFTWARE APPLICATIONS

CROSS-REFERENCE TO RELATED APPLICATIONS

This patent application claims the benefit of priority as a continuation patent application of U.S. patent application Ser. No. 16/777,428 filed Jan. 30, 2020; the entire contents of which are incorporated herein by reference.

FIELD OF THE INVENTION

This patent application relates to virtual machines and more specifically to efficiently providing virtual machines with different configurations for different software applications by running the software applications in thin linked clones of a base virtual machine, the liked clones being configured based upon the type of software application to be run thereon.

BACKGROUND OF THE INVENTION

In a variety of applications, virtualization technologies are employed to execute software applications (applications), e.g. Microsoft Windows® (hereinafter Windows) applications, in a Virtual Machine (VM) using operating systems (OSs) that cannot execute the applications natively, for example executing a Microsoft application on an Apple® macOS. Amongst exemplary commercial tools to provide such virtual machines are Parallels® Desktop or VMware Fusion®.

BRIEF DESCRIPTION OF THE DRAWINGS

Embodiments of the present disclosure will now be described, by way of example only, with reference to the attached Figures, wherein:

FIG. 2 depicts an exemplary workflow according to an embodiment of the present disclosure for establishing resource configuration data relating to linked clone VMs and applications executed therein.

FIG. 3 depicts an exemplary workflow according to an embodiment of the present disclosure for monitoring and updating resource configuration data for a VM or application.

DETAILED DESCRIPTION

Figure 1:
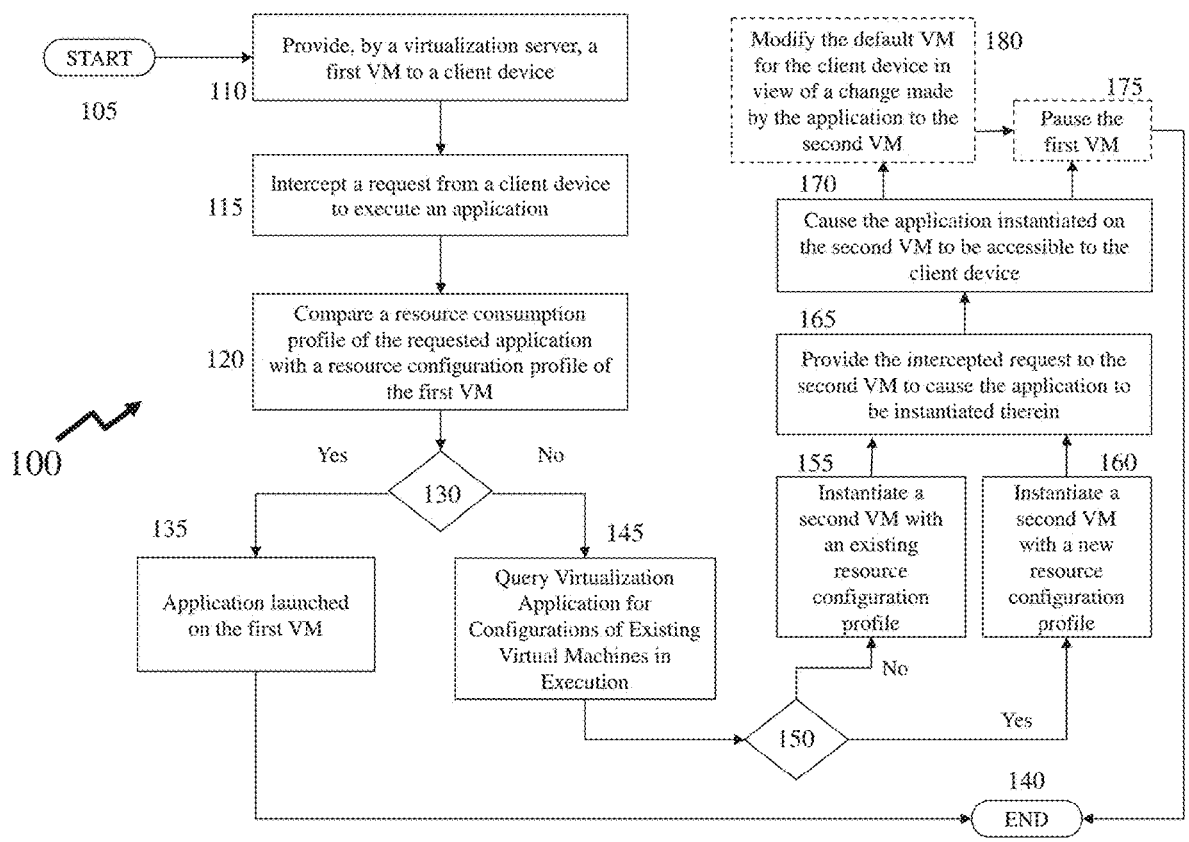
FIG. 1 depicts an exemplary workflow according to an embodiment of the present disclosure for establishing a linked clone virtual machine (VM) of a base VM.

The present description is directed to virtual machines and more specifically to providing virtual machines with different configurations for different software applications by running the software applications in thin linked clones of a base virtual machine created on the fly with configurations automatically established based upon the type of software application to be run.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the disclosure. It is to be understood that various changes can be made in the function and arrangement of elements without departing from the spirit and scope as set forth in the appended claims. Accordingly, an embodiment is an example of the present disclosure and not the sole embodiment. Various appearances of "one embodiment," "an embodiment" or "some embodiments" do not necessarily all refer to the same embodiments. Although various features of the disclosure may be described in the context of a single embodiment, the features may also be provided separately or in any suitable combination. Conversely, although the disclosed methods and systems may be described herein in the context of separate embodiments for clarity, the disclosed methods and systems can also be implemented in a single embodiment or any combination of embodiments.

Reference in the specification to "one embodiment," "an embodiment," "some embodiments," or "other embodiments" means that a particular feature, structure, or characteristic described in connection with the embodiments is included in at least one embodiment, but not necessarily all embodiments, of the present disclosure. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can," or "could" be included, that particular component, feature, structure, or characteristic is not required to be included.

Reference to terms such as "left," "right," "top," "bottom," "front," and "back" are intended for use in respect to the orientation of the particular feature, structure, or element within the figures depicting embodiments of the disclosure. It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers or groups thereof and that the terms are not to be construed as specifying components, features, steps or integers. Likewise, the phrase "consisting essentially of," and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the disclosure an application is generally presented in respect of software permanently and/or temporarily installed upon a PED and/or FED.

An "office application" as used herein may refer to, but is not limited to, an application employed by a user to provide functionality associated with activities relating to home, business, office, retail etc. Such applications may also be referred to as productivity software, personal productivity software and office productivity. Office application may include, for example, word processing, spreadsheet, simple graphics generation, note taker, electronic mail, desktop publishing, database management, instant messaging, and electronic forms. Such applications are generally low utilization on computer system resources such as central processing unit (CPU), graphical processing unit (GPU), memory, network access, web browser etc.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

A central processing unit (CPU), also called a central processor or main processor, as used herein, and throughout this disclosure, refers to the electronic circuitry within a computer that carries out the instructions of a computer program, such as an operating system or a software application for example, by performing the basic arithmetic, logic, controlling, and input/output (I/O) operations etc. specified by the instructions.

An "Application Programming Interface" (API) as used herein, and throughout this disclosure, refers to a set of subroutine definitions, communication protocols, and tools for building software. In general terms, it is a set of clearly defined methods of communication among various components. Exemplary APIs may be for a web-based system, an operating system, a database system, computer hardware, or a software library for example. An API specification may include, but not be limited to, specifications for routines, data structures, object classes, variables, or remote calls.

A "computer kernel," "compute kernel" or "kernel" as used herein, and throughout this disclosure, refers to a software routine compiled for execution by a high throughput accelerator, such as a GPU, digital signal processor (DSP) or field-programmable gate array (FPGA), which is separate from but used by a main software routine or program, which is typically running on a CPU. A kernel may also be referred to as a compute shader sharing execution units with vertex shaders and pixel shaders on GPUs but may not be limited to execution upon one class of device, e.g. GPU, or API, e.g. a graphics API.

A "virtual machine" (VM) as used herein, and throughout this disclosure, refers to an emulation of a computer system.

Virtual machines are based on computer architectures and provide functionality of a physical computer and their embodiment may involve specialized hardware, software, or a combination. A system virtual machine (also referred to as a full virtualization VM) provides a substitute for a real machine and provides the functionality needed to execute entire operating systems. A hypervisor exploiting native execution to share and manage hardware, allows for multiple environments which are isolated from one another, to co-exist upon the same physical machine concurrently. A hypervisor may exploit hardware-assisted virtualization, virtualization-specific hardware, primarily from the host CPUs. A process virtual machine is designed to execute a computer program in a platform-independent environment. Some virtual machines, such as a Quick Emulator (QEMU), are designed to also emulate different architectures and support execution of software applications and operating systems written for another CPU or architecture. Operating-system-level virtualization allows the resources of a computer to be partitioned via the kernel.

A "clone" as used herein, and throughout this disclosure, refers to a hardware or software system that is designed to function in the same way as another system.

A "thin" VM as used herein, and throughout this disclosure, refers to a VM established through thin provisioning where a hypervisor apportions only the amount of space that the thin VM is using on one or more physical memories rather than configuring an initial larger memory requirement, as employed by a "thick" VM.

Parallels Desktop from Parallels International GmbH (Parallels®) is software application providing hardware virtualization for Apple® Macintosh computers with Intel processors.

"Boot Camp Assistant" (Boot Camp) as used herein, and throughout this disclosure, refers to a multi-boot utility provided by Apple® for its Mac OS operating system which assists users in installing a Microsoft® Windows operating system on Intel-based Macintosh computers. Boot Camp guides the user through a non-destructive disk partitioning (including resizing of an existing partition, if necessary) of their hard disk drive or solid state drive and installation of Windows device drivers for their Apple hardware.

A "hook" as used herein, and throughout this disclosure, refers to software code that handles an intercepted function call, event or message. A hook is employed in the process of hooking which refers to a range of techniques used to alter or augment the behavior of an operating system, of applications, or of other software components by intercepting function calls or messages or events passed between software components.

As noted above in a variety of applications virtualization technologies are now employed to execute software applications (applications), e.g. Microsoft® Windows (hereinafter Windows) applications, upon an operating system (OS) which cannot execute the application natively, for example Apple® macOS. Amongst commercial tools to provide such virtualization include Parallels® Desktop or VMware® Fusion for example.

However, for a Windows application to run effectively there are certain minimum system requirements, e.g. CPU speed (e.g., determined by a number of available virtual and/or physical processors and their clock rates), amount of RAM, amount of video memory, etc., which should be met. Accordingly, these requirements mean that a Virtual Machine (VM) established through a virtualization technique where the Windows application is running should be configured in advance. However, different types of applications, for example Microsoft® Office applications, gaming applications, Computer Aided Design (CAD) applications, etc., accordingly require different settings for the VM. In order to address this, a provider of VM services seeking to have reasonable (or maximum) performance for each application provided to users is currently faced with three options. The first option is to establish a series of different VMs configured to run different types of application. The second option is to modify the VM configuration based on the type of application a user is currently running on the VM. The third option is to configure a single VM to have configuration that is large enough to accommodate all the applications the user of VM services may need to execute. However, all these options have significant disadvantages. For example, the third option may come at a cost of affecting the host (a provider of VM services) performance by burdening the host operating system (OS) resources unnecessarily and reducing a number of VMs that can be instantiated concurrently on the host server.

Accordingly, it would be beneficial to provide users with an alternative solution. In one embodiment, a single VM, referred to as a base ("base") VM may be established. Various software applications may be installed and managed on the base VM, but specific software applications may be run within what is referred to as "thin" linked clones of the base VM. A linked clone VM may be created very quickly ("on the fly") since no massive copying of data may be performed. More specifically, the linked clone VM may use the same (virtual) hard disk drive (HDD) space as used by the base VM with only a small amount of a private HDD space used to store private configuration data for the lined clone VM. The linked clone VM may be configured based on the user profile. The user profile may include information about typical applications accessed by the user, so that the configuration of the linked clone VM may be established automatically (without the user involvement). In some embodiments, the linked clone VM may be configured based on the specific application that is requested by the user (rather than on the user profile), if the requested application is not present in the user profile.

Benefits of the embodiments described include the ease of management of application installation, modification, updating, uninstallation, etc. Furthermore, the embodiments described allow each application to run effectively from both VM configuration and host resources consumption points of view. Beneficially, the embodiments described also lessen the need for a user to manually configure or reconfigure a state of the VM being used. Rather, resource usage by a given application is monitored in background and if a shortage of resources is detected then an optimum VM configuration is calculated automatically, and a new optimized VM clone to run the application is either created or reused on the fly, and the application is seamlessly moved to the new VM. Optionally, within embodiments of the disclosure information relating to the application, such as electronic content and/or files being edited etc., current pages within the software application, application window size(s) and position(s), etc.) are saved where these are supported by the application, transferred to the new VM, and restored when the application is restarted in the new VM.

Consider the scenario where a user needs to execute a Microsoft® Windows (hereinafter Windows) application designed to execute within a Windows operating system environment upon an Apple® Mac computer (hereinafter Mac) which provides an iOS operating system environment.

In order to use a Windows application upon a Mac without rebooting the computer to a Boot Camp partition, the user can, for example, employ Parallels Desktop, which allows Windows applications in a Virtual Machine (VM) side-by-side with macOS applications. Moreover, if the user Mac computer has sufficient hardware resources, multiple VMs can be executed side-by-side, each of which can have their own version of Windows OS installed, and independent sets of Windows applications.

However, physically, a VM running on a host computer, uses hardware resources, e.g. CPU cycles, RAM, disk input/output (I/O), network bandwidth, etc., concurrently with the host operating system (OS), host applications and, if more than one VM is running on the host, other VMs. Accordingly, it may be beneficial to establish limits on the resources consumed by a particular VM to ensure that sufficient hardware resources are available for each concurrently running application/VM for the whole computing environment to function with an acceptable performance.

Furthermore, different types of applications may have different system resource utilization patterns. For example, for adequate performance, a gaming application may require significant central processing unit (CPU) and graphical processing unit (GPU) resources, in addition to RAM and video memory. In contrast, an application such as a text editor would typically require significantly less CPU resources, limited GPU and memory resources, unless significant graphical and/or video elements have been embedded.

Within prior art virtualization tools, such as Parallels® Desktop, a user can create and apply a configuration profile to a VM. Via this VM profile, the user or a system administrator can establish VM parameters, which may determine, e.g., a number of available CPU cycles (per unit of time), an amount of RAM that the VM can access, a disk I/O speed, a network bandwidth, a GPU speed and the amount of memory allocated to the VM. The VM profile (configuration) may be specifically established to address an anticipated workload of the VMs run by the user, such as running office applications, a web browser, financial accounting software, a computer aided design (CAD) application, a modelling software application, a gaming application, etc. However, because the VM profile affects (e.g., determines) allocation of the host hardware resources, it may be difficult to modify the VM profile while the VM is running. It may, therefore, be advantageous to determine the VM profile during initiation of the VM rather than to attempt modifying the VM dynamically while the user is already running applications on the VM. Accordingly, in order to provide a configuration ensuring the performance desired by the user (referred to within this specification as an optimal configuration) for a particular anticipated workload of the VM session, the user or an administrator may generate the VM profile prior to executing the VM session. In some instances, the optimal configuration may cease to remain the optimal configuration because of the changes of the actual workloads, as various applications are being started and run by the user. In such instances, the user may have a number of options.

One option is to configure multiple VM profiles, each targeted at a particular workload. This may lead to a significant waste of the host disk space, CPU and memory resources, and the like. Another option is to create a single VM capable of supporting the maximum anticipated workload. This may similarly lead to a significant waste of the host disk space, computational and memory resources, etc. A third option is to support a single VM and run it as long as no significant hardware reconfiguration is required. In those instances, however, where the user needs additional resources (e.g., to employ a three-dimensional CAD application), the VM may be shut down and restarted with a new hardware profile. This, however, may waste user's time as the host server (e.g., the host's hypervisor) may have to perform multiple actions, such as updating the guest operating system (OS), drivers, and so on.

Accordingly, from the user's perspective, there is a conflict between a convenience of having a single entry point to maintain a guest OS (and application running on a single VM) and the need to maintain various hardware configurations tuned to various specific user workloads. At present, the available technological options outlined above do not address this conflict.

Aspects and implementations of the instant disclosure address this and other shortcomings of the existing technology, by describing a linked clone VM, which is a thin (shallow) copy of a base VM, and which uses the virtual HDD associated with the base VM. Nonetheless, a linked clone VM can have a configuration that is different from a configuration of the base VM. For example, the base VM may have many applications installed and configured, but only some of the applications of the base VM may be accessible from the linked clone VM being created. As described above, the specific applications made accessible to the user of the linked clone VM may be determined by the user's configuration profile. Once created, the linked clone VM may be run independently from the base VM. Each linked clone VM may also run independently from other linked clone VMs that are concurrently being provided to other users.

At the time of its creation, the linked clone VM reads data from the base VM HDD. Subsequently, when the linked clone VM is to write data to the virtual HDD, the data is stored in a private (to the linked clone VM) range of the virtual HDD. As a result, the original snapshot of the base VM remains intact and can be used in generating subsequent linked clone VMs.

To describe and depict a process of establishing a linked clone VM of a base VM and configuring the linked clone VM to supports software applications to be run therein, a reference is made to FIG. 1, which depicts an exemplary workflow 100, in accordance with some embodiments of the present disclosure. Various operations of workflow 100 will be better understood with reference to FIG. 5, which depicts an exemplary computer system 500 capable of providing a virtual linked clone infrastructure.

The workflow 100 may begin at block 105 wherein a user may initiate a virtualization session. The user may access a client device and enter login authentication information, in some embodiments. The client device may initiate a remote session on a virtualization server that may be communicatively (e.g., over a wired or wireless network, such as Internet, wireless local area network (WLAN), and so on) coupled to the client device. The virtualization server may provide a VM to the client device and the client device may make the provided VM accessible to the user (e.g., using a monitor and the input-output devices of the client device). In some embodiments, the user of the client device causes the VM to be provided by the virtualization server by selecting a specific configuration of the VM. In some embodiments, the virtualization server provides a default VM based on parameters (e.g., user's access level, group membership, and so on) determined by accessing a profile associated with the user or the client device. The creation of the VM results in the installation of a fresh image of a guest OS into it and the installation of an initial set of applications into the VM which the user requires for their activities, e.g. their normal or day-to-day activities. The virtualization application, e.g. Parallels® Desktop, generally includes a tools package, e.g. Parallels® Tools, which are installed into the VM providing a set of guest applications, services and drivers, which help to manage VM and integrate guest OS and guest applications functionality with the host OS. Specific details of functionality provided and/or required by the tools package necessary to implement embodiments of the disclosure is described subsequently below.

Figure 5:
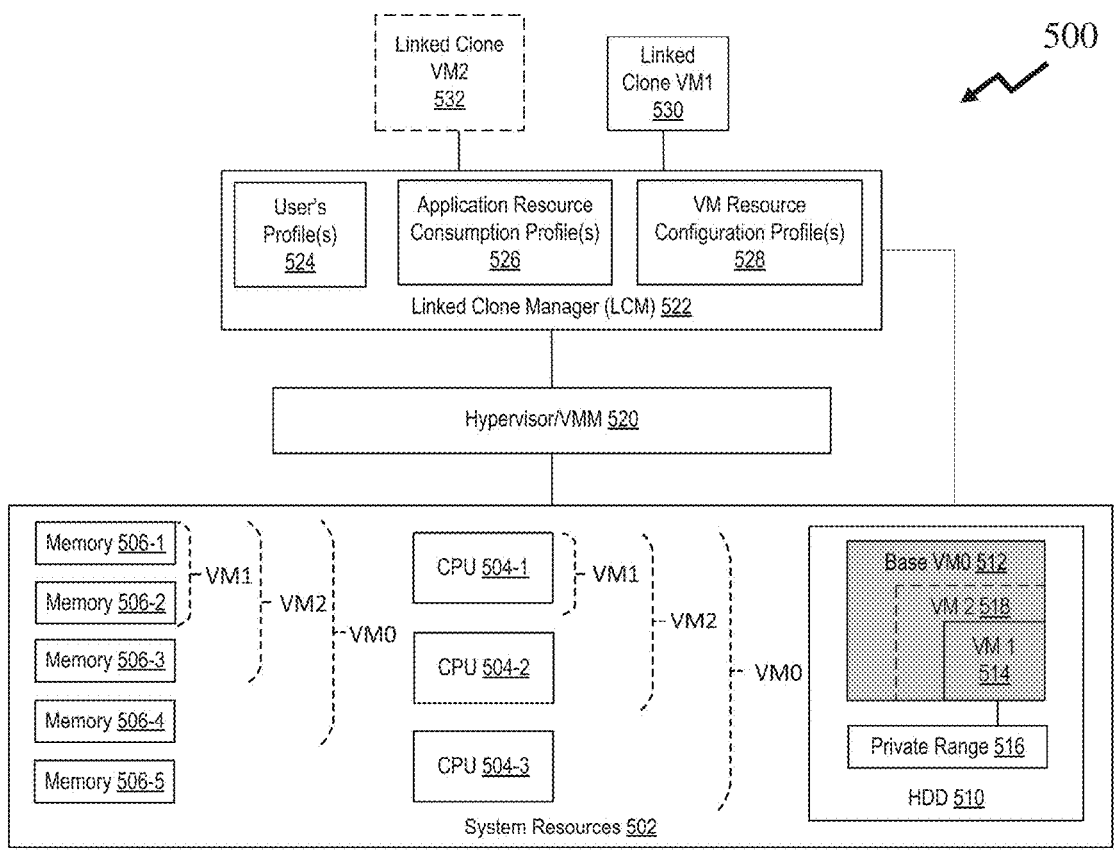
FIG. 5 depicts an exemplary computer system capable of providing a virtual linked clone infrastructure.

As illustrated in FIG. 5, the system 500 providing VM infrastructure (e.g., linked clone VM infrastructure), may include hardware resources 502, such as one or more memory devices 504-1 . . . 504-n, one or more CPUs (physical or virtual) 506-1 . . . 506-N, one or more HDD 510 (e.g., virtual HDD). The system 500 may have other hardware resources not shown in FIG. 5, such as I/O devices, network adapters, buses, and so on. The system 500 may have a hypervisor or virtual machine monitor (VMM) 520 to support one or more virtual machines. The system 500 may further include a linked clone manager (LCM) 530 to provide the linked clone VM functionality. In some embodiments, LCM 530 may be a part of the VMM 520. In some embodiments, LCM 530 may be a separate software (or firmware) component. In some embodiments LCM 530 may include Parallels Tools.

In some embodiments, the system 500 may have a base VM 512 (also referred to as VM0) whose configuration files and data may be stored in HDD 510, as depicted if FIG. 5. The first VM provided to the user may be a VM1 530, which may be a linked clone of the base VM0 512. The linked clone VM1 530 may be capable of accessing a shared range 514 of HDD 510. Depending on the number of applications to be provided via the linked clone VM1 530, the shared range 514 may be a portion of base VM 512. Since linked clone VM1 530 may read data directly from the shared range 514, instantiation of VM1 530 may be performed very fast with only minimal data (e.g., private configuration data) to be stored in the private range 516 of HDD 510. The VM1 530 (enabled by LCM 522) may then use the private range 516 to store data (such as changes and updates to the VM1 configuration, as well as data generated by various applications executed within VM1 530).

In some embodiments, the linked clone VM1 530 is a default VM to be provided to the user. In some embodiments, the user configures (at some point in the past, e.g., during a previous virtualization session) the user's profile (configuration profile) 524 based on user's typical computational demands and day-to-day activities, for example, either through a series of configuration settings or by selecting a configuration profile from a predefined set of configuration profiles. Subsequently, when the user logins and LCM 522 instantiates a VM for the user, LCM 522 may access the user's profile to determine what part 514 of the base VM0 512 is to be made accessible to the user via the linked clone VM1 530 provided to the user.

When the user receives and uses VM1 530, the base VM0 512 may be hidden from the user by LCM 522 so that only the linked clone VM1 530 is displayed within the UI. Accordingly, in this embodiment of the disclosure described and depicted by workflow 100 in FIG. 1, when a user starts a VM the user may actually start a linked clone VM1 530 while and the base VM0 512 remains hidden. However, in other embodiments of the disclosure, the user may be presented with the base VM0 530 and may run applications therein. (For example, the user may have the access rights to modify the base VM0 530.)

At block 115, a processing device implementing the method illustrated by the workflow 100 (e.g., a processor of the virtualization system 500) may intercept a request from the client device to the guest operating system of the first VM (e.g., VM1 530) to execute an application. For example, the user may select an application icon on the screen of the client device and input a request (e.g., by pressing a mouse button) to launch the selected application. The client device may transmit the user's request to the guest OS of the first VM. An API may redirect the request from the client device to the hypervisor/VMM 520 of the virtualization system 500 (or the host OS of the virtualization server, or a virtualization application) and prevent the request from reaching the guest OS of the first VM.

In some embodiments, when the user's request is being transmitted to the guest OS of the first VM, the process creation is intersected by a hook of LCM 522. In some embodiments, the hook may be installed by Parallels® Tools. The hook may be a special function, injected by means of a Windows API into the call path of Windows operations such that the injected function is called before the "hooked" one. Accordingly, this allows for modification or cancellation of the execution of the target function. Within embodiments of the disclosure, the hook suppresses the creation of the new process arising from the user initiating the launch of a new application, determines which application was about to start and stores its startup parameters. These stored startup parameters are then transferred to the application when the application is launched within a new VM, as described below.

At block 120, the processing device may continue with performing a comparison of a resource consumption profile 526 of the requested application with a first resource configuration profile 528 of the first VM. For example, the processing device may determine a predefined category to which the application being launched belongs, by, e.g., accessing a database of installed, on the virtualization system (server), applications, or applications accessible to the virtualization server. The database of applications may, for example, be a list of resource consumption profiles 526, each profile describing an application supported by the virtualization server. A resource consumption profile 526 may be established for office productivity applications, software development applications, CAD applications, video editing applications, gaming applications etc. The resource consumption profiles 526 and/or list of applications can be periodically updated by, for example, either a "pull" by the virtualization application from a remote database or a "push" from a provider of the virtualization application to the installed instance of the virtualized application. The updates of the resource consumption profiles 526 may be performed whenever the corresponding application is to require increased (or decreased) resources for its execution, such as when the application is reconfigured, updated, and so on.

The resource consumption profile 526 of the requested application may include a number of resource consumption metrics for the application, the metrics indicating an amount of computational resources required to efficiently execute the application (e.g., without noticeable, to the user, slowdowns). The consumption metrics may include a CPU reference speed (e.g., a number of CPU cycles per unit of time that may be required to efficiently execute the application), a reference amount of memory (including video memory), a reference disk space, or a reference network bandwidth, and the like. The reference values may be obtained from experience and knowledge of the system administrator, retrieved from the application specifications, and so on.

The resource configuration profile 528 of a (first, second, and so on) VM may comprise a number of VM performance metrics describing the amount of hardware that is accessible to the specific VM (e.g., to the specific linked clone VM). The performance metrics may include a CPU speed accessible to the VM (e.g., a number of CPU cycles that is allocated to the VM), an amount of memory accessible to the VM, a reference disk space accessible to the VM, or a reference network bandwidth accessible to the VM, and the like. Such performance metrics may reflect settings of the virtualization server (which may be set by a system administrator of the host).

Based on the comparison of the resource consumption profile 526 of the requested application with the resource configuration profile 528 of the first VM, the processing device performing method 100 may determine that the application is not to be executed on the first VM (decision-making block 130). For example, one of the performance metrics (e.g., available CPU speed) of the first VM may be below the corresponding application consumption metric (CPU speed). In some embodiments, a weighted performance metric may be compared with a weighted consumption metric, so that a deficiency in the amount of memory may be compensated with a high CPU speed and/or a large available disk space. In some embodiments, at least two performance metrics may need to be below the respective consumption metrics for the first VM to be deemed inadequate to support the requested application. In some embodiments, the performance metric of the first (or subsequent) VM may be reduced by the consumption metrics of the applications that may already be running on the first VM, and only the remainders (after subtraction) may be compared with the consumption metrics of the requested application.

If it is determined at block 130 that the application is not to be executed on the first VM, workflow 100 may proceed to block 145; otherwise workflow 100 proceeds to block 135.

Accordingly, if the first VM is capable of supporting the execution of the requested application with an acceptable level of performance, the processing device may launch the requested application on the first VM (block 135). Once the application is launched, the workflow 100 may end at block 140. The workflow 100 then awaits a launch of another application by the user.

In an instance that the first VM cannot support the requested application, per determination at the decision-making block 130, as described above, workflow 100 proceeds to block 145. At block 145, the processing device may query the hypervisor of the virtualization server or a virtualization application, e.g. Parallels® Desktop to determine if other resource configuration profiles 528 of VMs that may support the execution of the requested application currently exist. If it is determined at decision-making block 150 that such resource configuration profiles 528 do exist on the virtualization server, workflow 100 may proceed to block 155 where the hypervisor or the virtualization application may instantiate a second VM (VM2) having an existing configuration profile, as identified at block 150. If, on the other hand, it is determined at decision-making block 150 that such configuration profiles do not exist on the virtualization server, workflow 100 may proceed to block 160 where the hypervisor or the virtualization application may establish a new resource configuration profile, sufficient to support the execution of the requested application. The processing device may then instantiate the second VM with the new established resource configuration profile 528. A determination that the new resource configuration profile 528 is sufficient to support the requested application may be based on a comparison of the resource consumption profile 528 of the requested application with the resource configuration profile of the second VM. More specifically, the processing device may determine that the application consumption metric does not exceed the second VM performance metric (which may be performed in a way similar to how the respective comparison was performed for the first VM). The hypervisor/VMM 520 of the virtualization server may then instantiated a second guest OS on the second VM.

The second VM may be also be a linked clone VM, such as a linked clone VM2 532 shown in FIG. 5. The linked clone VM2 532 may have access to the shared region of HDD 510. In some embodiments, VM2 532 may have access to a larger region of HDD 510 than VM1 514, to meet the need to support a new application that has been requested by the user. The VM2 518 may have access to the same private range 516 that VM1 514 previously had, to support any previous applications that may have been accessed by the user via VM1 514. As indicated schematically in FIG. 5, VM 532 may be allocated larger memory resources and CPU power than VM1 530. In some embodiments, a linked clone VM may be instantiated having access to the full shared range of base VM0 512. Such a linked clone VM0 may have access to resources that are larger than the resources that may be allocated to VM1 530 or VM2 532. In some embodiments, a virtualization server may have more than one base VM.

At block 165, workflow 100 may continue with the processing device providing the intercepted request to the second OS to cause the application to be instantiated on the second VM. Providing the intercepted request to the second guest OS may be performed using an API (e.g., a Windows® API) to communicate a launch call (e.g., a CreateProcess call) to the second guest OS. Is some implementations, where a request to execute the application caused the intercepted launch call to have a set of parameters (e.g., the user configuration data, a name of a file to be opened, and so on), the launch call provided to the second guest OS may include the same set of parameters (or at least some of the same parameters).

At block 170, the processing device may cause the application instantiated on the second VM (e.g., VM2 532) to be accessible to the client device. In some embodiments, the transition to the second VM may be performed seamlessly so that the user is not aware of the change of the platform (from the first VM to the second VM). At an optional block 175, the hypervisor/VMM 520 of the virtualization server or a virtualization application may pause the first VM by, e.g., pausing the processes running in the first VM. In some embodiments, prior to pausing the first VM, the hypervisor may seamlessly transfer execution of other application run by the user to the second VM. Optionally, if the user terminates execution of the requested application, the second VM may be paused (suspended, shut down) whereas the first VM may be resumed (restarted).

At an optional block 180, the processing device performing workflow 100 may detect that the application made a change to a state of the second VM. The state of the second VM may refer to one or more configuration files of the application (e.g., a change in user settings, or an update to the application, and the like), in some embodiments. The state of the second VM may further refer to one or more configuration files of the second VM (e.g., an update to the second guest OS, an update to one or more drivers, and so on). The state of the second VM may be stored in the private range 516 of HDD 510. In some instances, the modification made by the application may be substantial enough so that it may be inefficient to lose the changes when the client session is closed. In such instances, the processing device may modify the default VM for the client device (which may be the first VM) in view of the change(s) made by the application to the state of the second VM. For example, the changes made by the application may be copied into the stored snapshot of the default VM for the client device (e.g., such as the stored snapshot VM 1 514). Accordingly, when the user of the client device is provided with another instance of a virtual machine (e.g., upon a subsequent login), the virtual machine provided to the user may be updated with the changes made during the previous session(s).

Upon completion of the block 170 (and, optionally, blocks 175 and 180), the process may proceed to block 140 and end. As before, it should be evident that after block 140 workflow 100 may proceed to execute other operations, not depicted for clarity, or loop back to block 115 where workflow 100 may awaits launch of another application by the same user, by another user, etc.

Accordingly, as a result of workflow 100 a user has the application, the one they wanted to launch, running in a VM with a compatible configuration for this particular application even though the user may have launched it within another VM with a different configuration.

FIG. 2 depicts exemplary workflow 200 according to an embodiment of the present disclosure, for establishing resource configuration data relating to linked clone VMs and applications executed therein. As depicted, at block 210 the exemplary workflow 200 starts with the user receiving one or more VMs (and their associated processes) and one or more applications. At block 220, the user may request execution of a new application, such as described above in relation to workflow 100 of FIG. 1. Upon receiving the request, the process proceeds to block 230, where workflow 200 continues with determining whether the requested application is a known application. A known application may be an application previously executed by the user (e.g., during one of prior VM session).

If the processing device determines that the application is known, at block 240, the processing device may access a local database to determine the resource consumption profile 256 of the requested application and, having retrieved the resource consumption profile 256, proceeds to block 260. If the processing device determines that the application is not known (e.g., the application has not been previously requested by the user of the first VM currently provided to the user), at block 250, the processing device may access a database that contains resource consumption profiles of various applications supported by the virtualization server. The first database may be local or remote. This database may, for example, be associated with the provider of the virtualization application associated with the first VM, associated with a provider of the application the user is seeking to launch, or a third party provider. Having retrieved the resource consumption profile 256 from the database of resource communication profiles, workflow 200 may proceeds to block 260.

At block 260, workflow 200 may calculates a new target resource configuration profile 528 for a virtual machine that is capable of supporting the requested application. The new target resource configuration profile 528 may be generated in view of the resource configuration profile of the current (first) VM and the resource consumption profile 526 of the application retrieved at block 240 or 250. At block 260, the processing device may determine that the linked clone VM1 530 can adequately support the requested application. Responsive to such determination, the processing device can instantiate the requested application on VM1 530 and provide the instantiated application to the user. In other instances, at block 260, the processing device may determine that the linked clone VM1 530 is insufficient to support the requested application, but that the VM2 532 having access to more memory and CPU resources (as depicted schematically in FIG. 5) may be required. In such instances, the processing device first instantiate the linked clone VM2 532 as described in relation to FIG. 1. After the linked clone VM2 532 is started, the processing device can instantiate the requested application on VM2 532 and provide the instantiated application to the user. Because VM2 532 has access to the range of HDD 510 used by VM1 530, the transfer of applications from VM1 530 to VM2 532 may be performed seamlessly, without the user noticing that the transition to a different VM has occurred. VM1 532 may then be paused or terminated. In some embodiments, where VM1 532 is paused, it may be re-activated once the user finishes working with the application that triggered transition from VM1 530 to VM2 532. Responsive to closing the application, a reverse transition from VM2 back to VM2 532 may be performed. Optionally, after ending at block 270, workflow 200 may return to an operation that initiated workflow 200.

FIG. 3 depicts an exemplary workflow 300 according to an embodiment of the present disclosure for monitoring and updating resource configuration data for a VM or application. Workflow 300 comprising first to eighth steps 310 to 380 respectively. In first step 310 the workflow 300 is called or launched from another workflow such as workflow 100 in FIG. 1, for example, and proceeds to second step 320. In second step 320 the application is launched within the VM, which may, for example, be the initial VM; a linked clone VM such as VM2, such as described above in respect of workflow 100 in FIG. 1 for example; another VM already in execution such as the identified VM, such as described above in respect of workflow 100 in FIG. 1 for example. From second step 320 the process proceeds to third step 330 wherein the resources used by the application are monitored which continues until fourth step 340 is performed wherein the user exits the application, the one they launched wherein the process proceeds to fifth step 350. In fifth step the monitored resources employed by the application when it was in execution are processed versus the resource configuration profile employed when the VM within which the application was launched was generated. From fifth step 350 after processing the employed resources the workflow 300 proceeds to sixth step 360 wherein a determination is made as to whether resource consumption profile for the application should be updated or not. If the determination is positive, then workflow 300 proceeds to seventh step 370 otherwise it proceeds to eighth step 380 and ends. In seventh step 370 the resource consumption profile for the application is updated/modified in dependence upon the processed monitored resources used by the application during execution after which the workflow 300 proceeds to eighth step 380 and ends.

The processing of the monitored resources of the application within embodiments of the present disclosure may be based upon, for example, only the last use of the application by the user, a predetermined number of last uses of the application by the user, or all last uses of the application by the user. Optionally, within other embodiments of the present disclosure, the processing of the monitored resources of the application may be based upon, for example, only the last use of the application by a set of users, a predetermined number of last uses of the application by the set of users, or all last uses of the application by the set of users. The set of users may be, for example, all users of the computer system associated with execution of the virtualization application and the establishment of the VM within which the user accesses and executes the application or it may be a predetermined subset of the users of the computer system established in dependence upon one or more rules maintained by the computer system or an owner of the computer system. Accordingly, the resource consumption profile for the application based upon use may vary as, for example, an educational establishment's use of the application results in a different resource consumption profile than that of a manufacturing enterprise, for example, also using the application. This may arise, for example, as the feature set of an educational version of the application licensed to the educational establishment differs from that of the version licensed by the manufacturing enterprise or the memory requirements differ etc. due to the average size of files worked upon in the two different environments.

Optionally, within embodiments of the present disclosure the processed monitored resources may be communicated to a provider of the virtualization application and/or a provider of the application allowing processing of processed monitored resources to be tracked across a larger user base in order to determine whether a profile stored by one or both of these, such as within the first database and/or second database described above in respect of FIG. 2, should be adjusted to reflect typical user scenarios rather than initial base scenarios.

Whilst the workflow described by workflow 100 executes automatically so that no user interactions are required this may not always be the case. For example, a user may be presented with an option in variants of the workflows such as those described in respect of FIGS. 1 to 3 such that, for example the decisions at block 240 in workflow 200 in FIG. 2 and block 360 in workflow 300 in FIG. 3 are based upon user input rather than automatic processing. Similarly, the determination at block 130 in workflow 100 in FIG. 1 may be through user input rather than automatically defined within other embodiments of the present disclosure such that a user may continue with the current VM in the first instance even though execution of the application may be limited or sub-optimal. Additionally, the determination at block 150 in workflow 100 in FIG. 1 may be through user input rather than automatically defined within other embodiments of the present disclosure such that a user may force the workflow 100 to launch a new linked clone VM, VM2, or use an existing VM, the identified VM.

The exemplary workflow 100 described above and depicted in FIG. 1 executes automatically such that the user accesses the launched application within another VM UI where the initial VM is not suitable. According to the speed and manner in which this workflow is performed the transition from the initial VM to another VM, e.g. VM2 or identified VM, should be relatively seamless to the user. However, the seamless nature of the process may be improved through other techniques including but not limited to executing the VMs in what is known by the inventors "coherence mode." Coherence mode, as described within U.S. Pat. No. 7,788,593B1, and implemented within virtualization applications such as Parallels™ Desktop is a display mode wherein application windows running within a VM environment are rendered within the US without any associated backgrounds. For example, a Microsoft™ Windows application running within a VM under Parallels™ Desktop running on an Apple™ Mac is rendered without any Microsoft™ Windows background but is another window rendered within windows of native Apple™ macOS applications. In this manner the user has simply views Microsoft™ Windows applications running side by side with Apple™ macOS ones as the window of the VM itself is hidden. Accordingly, in this case, when a user starts an application in one VM, and the application's launch is transferred to another VM, as described above in respect of workflow 100 in FIG. 1 or within other embodiments of the present disclosure, then the overall process looks seamless for the user as the creation of the other VM, e.g. VM2 or identified VM, and its launch are not visible to the user, they are so to speak performed behind the scenes.

If a user runs a series of applications within a session which require differently configured VMs, e.g. a series of new VMs such as VM2 and/or identified VM in each instances, then the potential exists for the subsequent linked clone VMs to diverge substantially from the base VM and each other where the series of applications are installed in a series of linked VM clones. Accordingly, there exists the potential as result of this sequence of applications that the set of applications and their associated data in each subsequent VM will become increasing different and increasingly difficult or complex to transfer from the current VM, e.g. a VM2 or identified VM, to the next VM, e.g. a VM2 or identified VM. For example, one or more of the applications might not exist within the next VM or it/they might depend on some data which is available in a previous VM to which the application was initially installed to.

Accordingly, the overall changes accumulated through a sequence of linked clone VMs may be written as a difference file or delta file back to a first VM, for example the base VM or the initial clone VM of a base VM in the sequence. Accordingly, this first VM with written back changes (deltas) of the subsequent sequence may be viewed as a "rebased" VM which is then flagged within workflows according to embodiments of the present disclosure as being a new base VM from which linked clones should be generated. Within embodiments of the present disclosure this process this generation of a difference file and its write back/merge with the base VM or a copy of the base VM are performed automatically where the changes exceed one or more predetermined thresholds relating to the resource configuration such as number of CPU processors, number of GPU processors, RAM, video RAM etc. This automatic process being triggered, for example, each time the user finishes working with a linked clone VM or their launching of a new application triggers a process such as that described above and depicted in respect of FIG. 1. Optionally, the automatic process may be triggered by other factors such as date, duration of session by the user, an association of the user (e.g. to a particular team, group, enterprise, etc.), and number of linked cloned VMs generated for example.

Optionally, the generation of a difference file and its write back/merge with the base VM or a copy of the base VM may be linked to a specific user or to a specific set of users. Accordingly, for example, using the example of an educational establishment each user within an engineering department may have a different effective base VM where the difference file and its write back/merge with the base VM or a copy of the base VM are based upon a specific user as it is the user's specific actions with respect to which applications they launch, in what sequence, etc. In the case where it is a specific set of users then the difference file and its write back/merge may be through a process which acquires all data from the specific set of users and generates an "overall difference" which may be a maximum change, average change, or other derived change. In this manner, users within an engineering department may have a different effective base VM to those users within the history department even though both sets of users access VMs through the same virtualization application(s) on the same computer system(s).

While the embodiments of the present disclosure described above and depicted with respect to FIGS. 1 to 3 respectively the process have been described as being associated within a linked clone VM it would be evident that the processes, options, variants, etc. may be applied to a base VM or a VM in general. Accordingly, embodiments of the present disclosure may support the automatic migration of a second VM from a first VM where a determination that the resources of the first VM cannot or may not support an application the user wishes to launch within the first VM.

Accordingly, embodiments of the present disclosure provide for a user to be automatically provided with access to and employ a VM upon launching an application which is established in a configuration suitable for the application even though the user initially launched it within another VM. Beneficially embodiments of the present disclosure address the limitation within the prior art wherein a user must not only have previously created and configured multiple VMs in order to exploit them but also remember which VM they have created has the necessary configuration for a given pattern of applications the user wishes to employ, which the inventors refer to as a work pattern for a user, and launch the applications manually within that VM. It would be evident that a user when selecting to launch a new application may not actually be aware of the requirements upon the configuration of the VM for that application and accordingly may try to launch the application within several VMs each of which cannot execute the application either at all or in a manner meeting the user's expectations for its performance. In contrast embodiments of the present disclosure make it possible for a virtualization application to automatically create and configure a cloned VM which are compatible with the user's work pattern including the application they wish to launch and transfer the application launch to the cloned VM where the cloned VM to which the application launch is transferred is configured for executing the application the user wishes to launch as well as their overall work pattern.

Figure 4:
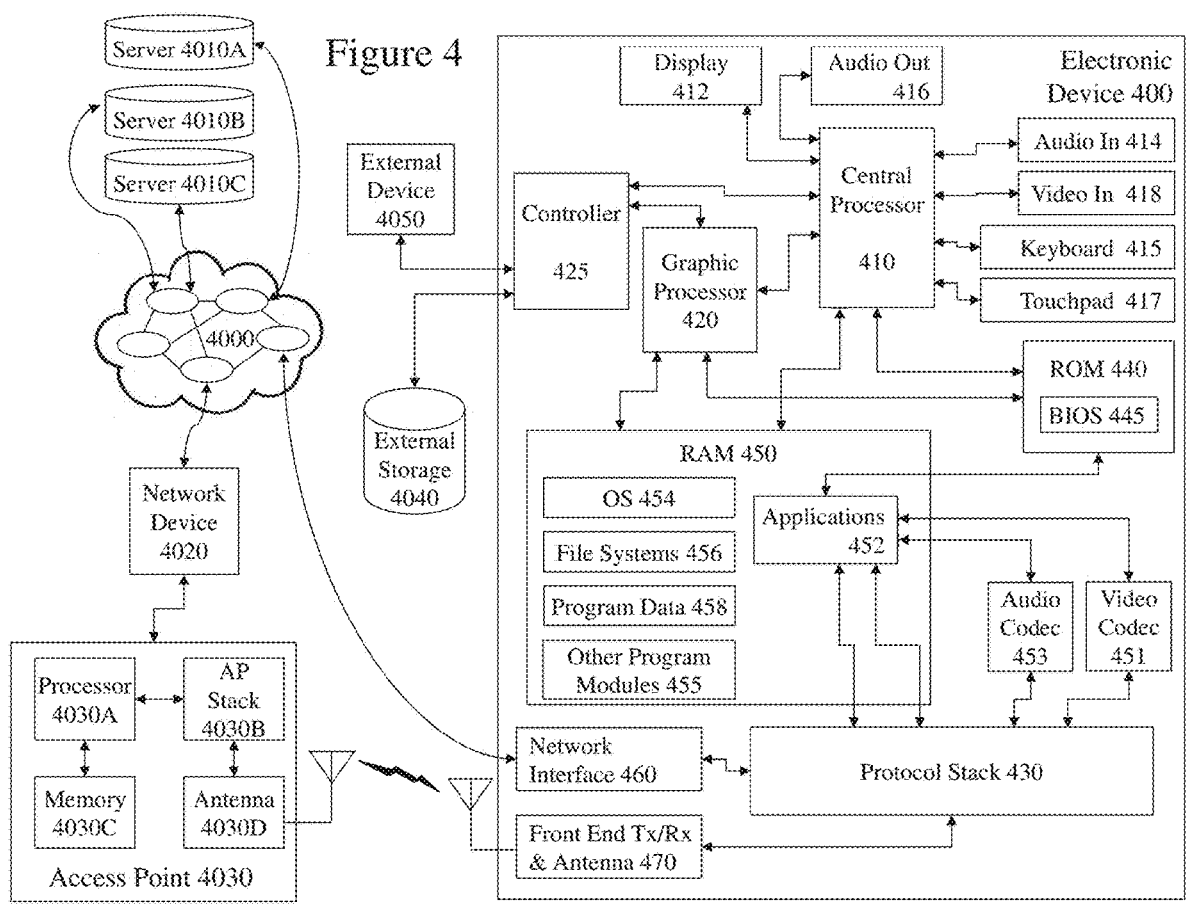
FIG. 4 depicts an exemplary computer system supporting embodiments of the present disclosure.

FIG. 4 depicts an exemplary computer system supporting embodiments of the present disclosure. Shown in FIG. 4 is an Electronic Device 400 supporting virtual machine emulation systems, applications, and platforms (VME-SAPs) and/or VME-SAP features according to embodiments of the present disclosure. Electronic Device 400 may, for example, be a PED, a FED, or a wearable device and may include additional elements above and beyond those described and depicted. Also depicted in conjunction with the Electronic Device 400 are exemplary internal and/or external elements forming part of a simplified functional diagram of an Electronic Device 400 within an overall simplified schematic of a system supporting SSAP features according to embodiments of the present disclosure which include includes an Access Point (AP) 4030, such as a Wi-Fi AP for example, a Network Device 4020, such as a communication server, streaming media server, and a router. The Network Device 4020 may be coupled to the AP 4030 via any combination of networks, wired, wireless and/or optical communication links. Accordingly, the Electronic Device 400 can communicate via the AP 4030 and Network Device 4020 to Network 4000 and therein to remote services such as those depicted by First to Third Remote Servers 4010A to 4010C respectively.

As depicted the Network Device 4020 communicates to the AP 4030 via one or more wireless communications standards through Front End Tx/Rx & Antenna 470 to the Antenna 4030D within the AP 4030. These wireless communications standards including, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example an Electronic Device 400 may employ GSM services such as telephony and SMS and Wi-Fi/WiMAX data transmission, VOIP and Internet access. Accordingly, Electronic Devices 400 may also form associations either through standards such as IEEE 802.15 or Bluetooth in an ad-hoc manner as well as structured manners with other protocols.

The Electronic Device 400 is also depicted as communicating to the Network 4000 via Network Interface 460 which provides a wired interface for the Electronic Device 400 to communicate externally. The Network Interface 460 may employ one or more wired interface including, but not limited to, DSL, Dial-Up, DOCSIS, Ethernet, G.hn, ISDN, MoCA, PON, and Power line communication (PLC). The Network Interface 460 may interface directly to Network 4000 or via one or more interfaces such as a Network Device 4020.

As depicted the Electronic Device 400 includes one or more Central Processors (CPUs) 410 as well as one or more Graphical Processing Units (GPUs) 420. Each of the CPU 410 and GPU 420 are coupled to ROM 440 and RAM 450. A non-exhaustive list of examples for any of CPU 410 and GPU 420 includes a central processing unit, a single core microprocessor, a multi-core microprocessor, a digital signal processor (DSP), a reduced instruction set computer (RISC), a complex instruction set computer (CISC), a virtual central processing unit and the like. A GPU may be an internal GPU, a hybrid GPU or an external GPU. Furthermore, any of CPU 410 and GPU 420 may be part of application specific integrated circuits (ASICs) or may be a part of application specific standard products (ASSPs). A non-exhaustive list of examples for memories providing ROM 440 includes any combination of the following semiconductor devices such as registers, latches, ROM, EEPROM, flash memory devices, universal serial bus (USB) removable memory, and the like. A non-exhaustive list of examples for memories providing RAM 450 includes any combination of the following semiconductor devices such as registers, latches, flash memory devices, non-volatile random access memory devices (NVRAM), SDRAM, DRAM, double data rate (DDR) memory devices, SRAM, universal serial bus (USB) removable memory, and the like.

Electronic Device 400 may include an audio input element, Audio Input 414, for example a microphone, and an audio output element, Audio Output 416, for example, a speaker, coupled to any of CPU 410. Electronic Device 400 may include a video input element, Video In 418, for example, a video camera or camera, and a video output element, Display 412, for example an LCD display, coupled to any of processors 410. Electronic Device 400 also includes a Keyboard 415 and Touchpad 417 which may for example be a physical keyboard and touchpad allowing the user to enter content or select functions within one of more software applications, Applications 452. Alternatively, the Keyboard 415 and Touchpad 417 may be predetermined regions of a touch sensitive element forming part of the display within the Electronic Device 400. The one or more Applications 422 are typically stored in RAM 450 and are executable by any combination of CPU 410 and GPU 420. The RAM 450 also stores one or more operating systems, OS 454, one or more file systems, File Systems 456, program data, Program Data 458, and other software, Other Program Modules 455 as well as Applications 452. The ROM 440 stores the basic input/output system (BIOS) for the CPU 410 and GPU 420.

The Electronic Device 400, as depicted, also incorporates a Controller 425 which communicates with an External Device 4050 and an External Storage 4040. The External Device 4050 and External Storage 4040 may include, but not be limited to, a hard disc drive (HDD), magnetic disk drive, an optical disk drive, and solid state memory. The Controller 425 may communicate with the External Drive 4050 and External Storage 4040 with a serial interface and/or parallel interface. The Electronic Device 400 also includes an Audio Codec 453 and a Video Codec 451 where such codecs (coders-decoders) may be a device or computer application for encoding or decoding a digital data stream or signal.

The Electronic Device 400 also includes a Protocol Stack 430 which may implement, but not be limited to, an IEEE 802.11 protocol stack but alternatively may exploit other protocol stacks such as an Internet Engineering Task Force (IETF) multimedia protocol stack for example. Likewise, AP Stack 4030B within the AP 4030 exploits a protocol stack but is not expanded for clarity. Elements of Protocol Stack 430 and AP Stack 4030B may be implemented in any combination of software, firmware and/or hardware. Within the exemplary configuration of an IEEE 802.11 protocol stack then the Protocol Stack 430 includes an IEEE 802.11-compatible PHY module that is coupled to one or more Tx/Rx & Antenna Circuit 470 and an IEEE 802.11-compatible MAC module coupled to an IEEE 802.2-compatible LLC module. Protocol Stack 430 may also include, for example, a network layer IP module, a transport layer User Datagram Protocol (UDP) module, a transport layer Transmission Control Protocol (TCP) module, a session layer Real Time Transport Protocol (RTP) module, a Session Announcement Protocol (SAP) module, a Session Initiation Protocol (SIP) module and a Real Time Streaming Protocol (RTSP) module. Protocol Stack 430 may also include a presentation layer media negotiation module and a call control module whilst in some configurations the Protocol Stack 430 may also incorporate the one or more Audio Codecs 453 and one or more Video Codecs 451. Applications 452 may be able to create maintain and/or terminate communication sessions with any Network Device 4020 by way of AP 4030.

Typically, Applications 452 may activate any of the SAP, SIP, RTSP, media negotiation and call control modules for that purpose whilst information typically propagates from the SAP, SIP, RTSP, media negotiation and call control modules to the PHY module through TCP module, IP module, LLC module and MAC module. It would be apparent to one skilled in the art that elements of the Electronic Device 400 may also be implemented within the AP Stack 4030B within AP 4030. PEDs, FEDs, and wireless devices as represented by Electronic Device 400 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

One or more other devices, referred to as associated devices, not depicted for clarity may be coupled to the Electronic Device 400 through a wireless interface or wired interface, or optical interface. Such ASDEVs may include, but not be limited to, a wearable device, a PED, a FED, a medical implant etc. In addition to the AP Stack 4030B the AP 4030 incorporates other elements, including but not limited to, Processor 4030A, Memory 4030C, and Antenna 4030D.

Accordingly, Electronic Device 400 represents a block diagram illustrating a computer system on which graphics pipeline emulation systems, applications and platforms in their entirety or partially in conjunction with one or more other Electronic Devices 400 and/or other PEDs, FEDS, wearable devices, embedded devices, servers and other forms of computing devices etc. may be implemented in accordance with exemplary embodiments of the present disclosure. Elements of the Electronic Device 400 may be coupled to one or more system busses, which are not depicted for clarity, including but not limited to RAM 450, ROM 440, CPU 410, GPU 420, Controller 425, Network Interface 460, Front End Tx/Rx & Antenna 470. The GPU 420 communicates with the CPU 410 via a system bus or system busses or other interface to receive input data and/or executable program codes and/or send back computation results. Such system bus or busses may include, but not be limited to, a bus memory or bus memory controller, a peripheral bus, and a local bus that is able to interact with any other bus architecture. Examples of such system bus or busses may include, but not be limited to, PCI, ISA, PCI-Express, HyperTransport™, InfiniBand™, Serial ATA, I2C, and other suitable interconnects.

In some aspects of the present disclosure, the GPU 420 may include an interface for providing output data to the Display 412. The GPU 420 may drive the Display 412 by providing graphics data from an image buffer (not shown for clarity). In other aspects of the present disclosure, the GPU 420 may include internal memory, e.g. video RAM, RAM, and any number of buffers. Elements of GPU program codes, e.g. shaders such as Vertex Shader 320, Hull Shader 330, Domain Shader 340, and Pixel Shader 370 depicted in FIG. 3, may be provided to the GPU 420 by the CPU 410.

As noted above the CPU 410 may include a single or multiple sets of processors having single or multiple cores. The CPU 410 or GPU 420 may discretely or in combination execute one or more computer-executable codes implementing the techniques of the present disclosure. The system memory of the Electronic Device 400 may be any memory for storing data used herein and/or computer programs that are executable by the CPU 410 and GPU 420 and may include RAM 450, ROM 440, non-volatile memory such as flash memory for example or any combination thereof. The BIOS 445 within ROM 440 may store the basic procedures for transfer of information between elements of the computer system represented by Electronic Device 400, such as those at the time of loading the OS 454 from RAM 450 with the use of the ROM 440. Further, whilst Electronic Device 400 is depicted as coupled to remote memory via Network 400 within first to third Servers 4010A to 4010C respectively or External Storage 4040 via Controller 425 the computer system represented by Electronic Device 400 may also include one or more storage devices, not depicted for clarity, such as one or more removable storage devices, one or more non-removable storage devices, or a combination thereof. Such removable storage devices and/or non-removable storage devices may be connected to the system bus or busses as well as being one or more External Devices 4050 also coupled to the Electronic Device 400 via Controller 425. Within embodiments of the present disclosure storage devices and their corresponding computer-readable storage media are power-independent modules for the storage of computer instructions, data structures, program modules, and other data of the computer system represented by Electronic Device 400.

As depicted RAM 450 stores the OS 454, File Systems 456, Program Data 458, and Other Program Modules 455 together with the Applications 452 and, optionally, codecs such as Audio Code 453 and Video Codec 451. However, within embodiments of the present disclosure these may be stored within the system memory, e.g. RAM 450, as well as within one or more other removable storage devices and/or non-removable storage devices of the computer system represented by Electronic Device 400. Specific portions of the stored data may be associated with specific memory and/or memory devices or these may be distributed and/or dynamically assigned. In addition to the interfaces described with respect to Electronic Device 400, namely Touchpad 417, Keyboard 415, Video In 418, Audio In 414, Display 412, and Audio Out 416 other input/output (I/O) interfaces may be employed for receiving input and providing output to users or external devices. Optionally, one or more of these I/O interface may be associated with another Electronic Device 400 which is coupled to the Electronic Device 400 via wired, wireless or optical interface. For example, user input may be made via a wearable device coupled to the Electronic Device 400 via a short range wireless interface such as Bluetooth, for example. Such external devices and/or other Electronic Devices 400 may include peripheral devices, such as a mouse, a stylus, a game controller, or other peripheral devices, such as a printer or scanner via one or more I/O ports. Such I/O ports providing optical and/or wired interface including, but not limited to a serial port, a parallel port, a universal serial bus (USB) port, or other peripheral interface ports. The Display 412 may be a monitor, LCD display, LED display, plasma display, a projector, etc. either integrated as part of or in communication with the Electronic Device 400.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Embodiment of the techniques, blocks, steps and means described above may be done in various ways. For example, these techniques, blocks, steps and means may be implemented in hardware, software, or a combination thereof. For a hardware embodiment, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software embodiment, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in embodiment where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, cache, SRAM, DRAM, zero capacitor RAM, twin transistor RAM, eDRAM, EDO RAM, DDR RAM, EEPROM, NRAM, RRAM, SONOS, PRAM, flash memory devices and/or other machine readable mediums for storing information. Other machine readable mediums may include solid state drives (SSDs), magnetic cassettes, magnetic tape, magnetic disk storage, optical storage, compact disks (CD-ROM), and digital versatile disks (DVDs).

The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present disclosure has been presented for purposes of illustration and description. It is not intended to be exhaustive or to limit the present disclosure to the precise forms disclosed. Many variations and modifications of the embodiments described herein will be apparent to one of ordinary skill in the art in light of the above disclosure. The scope of the present disclosure is to be defined only by the claims appended hereto, and by their equivalents.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present disclosure should not be limited to the performance of their steps in the order written, and one skilled in the art can readily appreciate that the sequences may be varied and still remain within the spirit and scope of the present disclosure.

What is claimed is:

1. A method comprising:
receiving, by a virtualization server, a request to provide a virtual machine (VM) to a client device;
instantiating a first VM on the virtualization server;
intercepting a request to the first VM to execute an application;
determining, based on a comparison of a resource consumption profile of the application with a resource configuration profile of the first VM, that the application is not to be executed on the first VM;
determining, based on a comparison of the resource consumption profile of the application with a resource configuration profile of a second VM, that the application is to be executed on the second VM;
instantiating the second VM on the virtualization server, wherein the second VM is a linked clone VM of a base VM, wherein the second linked clone VM has a read-only access to a second shared range of a persistent memory, the second shared range being larger than a first shared range;
instantiating the application on the second VM; and
causing the application instantiated on the second VM to be accessible to the client device.

2. The method according to claim 1, wherein
the linked clone VM has a read-only access to a shared range of a persistent memory associated with the base VM.

3. The method according to claim 1, wherein
the linked clone VM has a read-only access to a shared range of a persistent memory associated with the base VM;
the shared range is larger than another shared range associated with the base VM.

4. The method according to claim 1, wherein
the first VM is another linked clone VM of the base VM; and
the another linked clone VM has:
   a read-only access to the first shared range of a persistent memory associated with the base VM, wherein the first shared range of the persistent memory is determined in view of a profile associated with the client device and stores at least one application installed on the virtualization server; and
   a write access to a private range of the persistent memory, wherein the private range is associated with the first VM; and
the second VM has a read-only access to the shared range of the persistent memory associated with the base VM.

5. The method according to claim 1, wherein
the first VM is another linked clone VM of the base VM; and
the another linked clone VM has:
   a read-only access to the first shared range of a persistent memory associated with the base VM, wherein the first shared range of the persistent memory is determined in view of a profile associated with the client device and stores at least one application installed on the virtualization server; and
   a write access to a private range of the persistent memory, wherein the private range is associated with the first VM; and
the second clone VM has a read-only access to the shared range of the persistent memory associated with the base VM; and the shared range of the persistent memory for the second VM is larger than another shared range associated with the base VM.

6. A method comprising:
receiving, by a virtualization server, a request to provide a virtual machine (VM) to a client device;
instantiating a first VM on the virtualization server;
intercepting a request to the first VM to execute an application;
determining, based on a comparison of a resource consumption profile of the application with a resource configuration profile of the first VM, whether the application is to be executed on the first VM or not;
upon determining that the application will not be executed on the first VM:
  determining, based on a comparison of the resource consumption profile of the application with resource configuration profiles of a plurality of second VMs, whether the application is to be executed on a second VM of the plurality of second VMs or not;
  upon determining that the application will not be executed on any of the plurality of second VMs:
    establishing a new resource configuration profile to support execution of the requested application;
    instantiating a new second clone VM where the new second clone VM is a linked clone of a base VM with the new resource configuration profile, wherein the new second clone VM has a read-only access to a shared range of a persistent memory associated with the base VM, the shared range is larger than another shared range associated with the base VM;
    instantiating the application on the new second clone VM; and
    causing the application instantiated on the new second clone VM to be accessible.

7. The method according to claim 6, wherein
the first VM is another linked clone VM of the base VM; and
the another linked clone VM has:
  a read-only access to a first shared range of a persistent memory associated with the base VM, wherein the first shared range of the persistent memory is determined in view of a profile associated with the client device and stores at least one application installed on the virtualization server; and
  a write access to a private range of the persistent memory, wherein the private range is associated with the first VM; and
the new second clone VM has a read-only access to the shared range of the persistent memory associated with the base VM.

8. The method according to claim 6, wherein
the first VM is another linked clone VM of the base VM; and
the another linked clone VM has:
  a read-only access to a first shared range of a persistent memory associated with the base VM, wherein the first shared range of the persistent memory is determined in view of a profile associated with the client device and stores at least one application installed on the virtualization server; and
  a write access to a private range of the persistent memory, wherein the private range is associated with the first VM; and the new second clone VM has a read-only access to the shared range of the persistent memory associated with the base VM;
the shared range of the persistent memory for the new second clone VM is larger than another shared range associated with the base VM.

9. The method according to claim 6, wherein
the new resource configuration profile to support execution of the requested application is established by one of a hypervisor associated with the virtualization server and a virtualization application associated with the client device.

10. The method according to claim 6, wherein
the new resource configuration profile is established in dependence upon a predefined category associated with the application; and
the new resource configuration profile is established in dependence upon a database accessible to the virtualization server comprising a list of resource consumption profiles, each resource consumption profile describing software applications supported by the virtualization server.

11. The method according to claim 6, wherein
the new resource configuration profile is established in dependence upon a predefined category associated with the application; and
the new resource configuration profile is established in dependence upon a database accessible to a virtualization application in execution upon the client device comprising a list of resource consumption profiles, each resource consumption profile describing software application supported by the virtualization server.

12. The method according to claim 6, wherein
the new resource configuration profile is established in dependence upon a predefined category associated with the application;
the new resource configuration profile is established in dependence upon a database accessible to a virtualization application in execution upon the client device comprising a list of resource consumption profiles, each resource consumption profile describing a list of software application supported by the virtualization server; and
at least one of a resource consumption profile of the list of resource consumption profiles and the list of software applications associated with another resource consumption profile of the list of resource consumption profiles are updated periodically in dependence upon request by the virtualization application for an update from a remote database.

13. The method according to claim 6, wherein
the new resource configuration profile is established in dependence upon a predefined category associated with the application;
the new resource configuration profile is established in dependence upon a database accessible to a virtualization application in execution upon the client device comprising a list of resource consumption profiles, each resource consumption profile describing a list of software application supported by the virtualization server; and
at least one of a resource consumption profile of the list of resource consumption profiles and the list of software applications associated with another resource consumption profile of the list of resource consumption profiles are updated periodically in dependence upon an update received by the virtualization application from a remote database.

14. The method according to claim 6, further comprising
- upon determining that the application will be executed on the first VM instantiating the application with the first VM;
- upon determining that the application will be executed on a second VM of the plurality of second VMs;
- monitoring the resources used during execution of the application within the VM within which the application was launched, the VM being one of the one of the first VM, the second VM of the plurality of second VMs and the new second clone VM;
- processing the employed resources from the monitoring against the resource configuration profile of the VM;
- determining whether the resource consumption profile of the VM should be updated or not in dependence upon the processing; and
- upon a determination that the resource consumption profile of the VM should be updated updating the resource consumption profile of the VM in dependence upon the processed monitored resources used by the application during its execution within the VM.

* * * * *